J. T. WADE.
DEMOUNTABLE WHEEL.
APPLICATION FILED JUNE 6, 1914.
1,143,870.
Patented June 22, 1915.
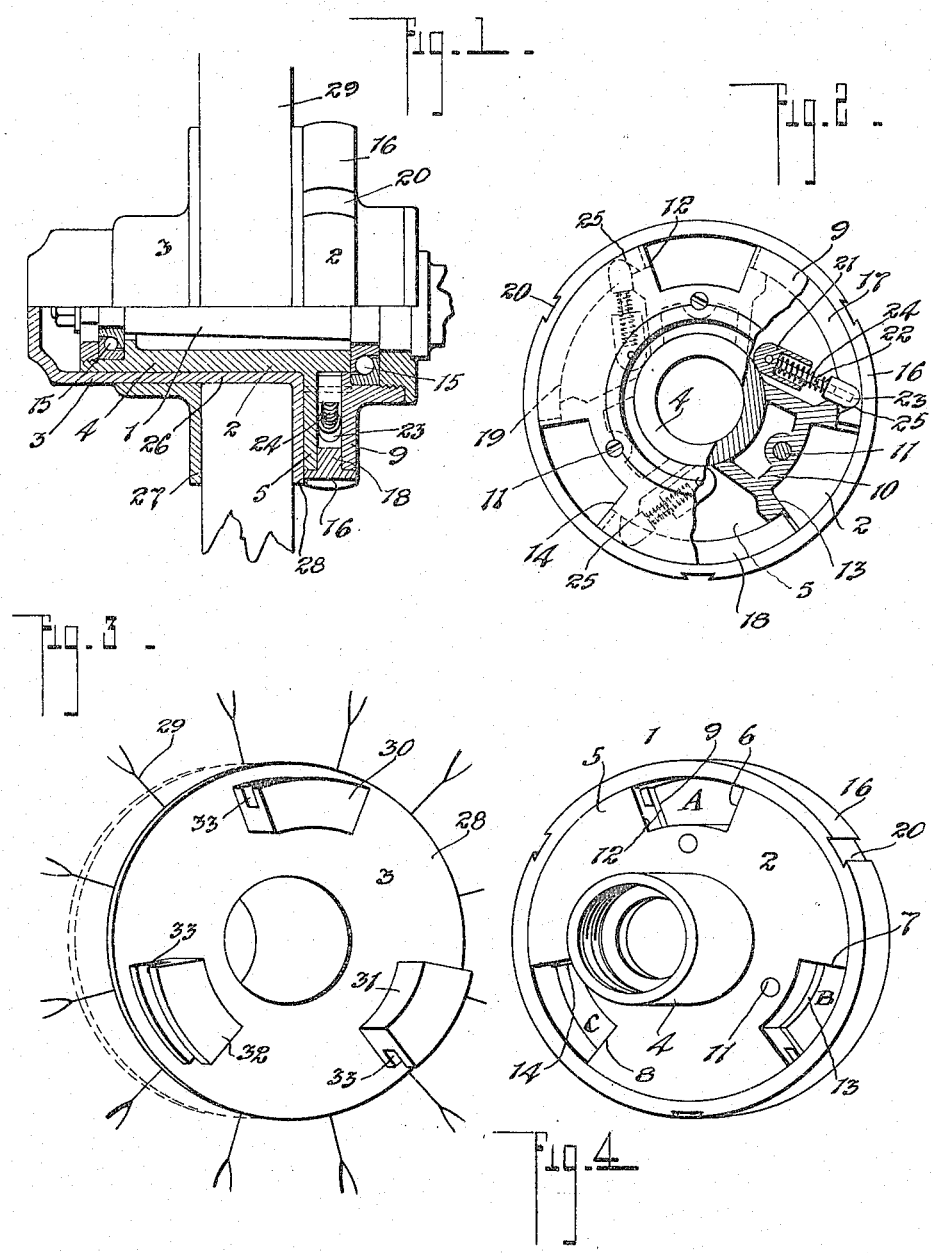
WITNESSES
INVENTOR
By
Attorney.

UNITED STATES PATENT OFFICE.

JETHRO THOMAS WADE, OF PETERBOROUGH, ENGLAND.

DEMOUNTABLE WHEEL.

1,143,870.

Specification of Letters Patent. Patented June 22, 1915.

Application filed June 6, 1914. Serial No. 843,591.

*To all whom it may concern:*

Be it known that I, JETHRO THOMAS WADE, of the city of Peterborough, in the county of Northampton, England, have invented certain new and useful Improvements in Demountable Wheels, of which the following is the specification.

The invention relates to an improvement in vehicle wheels and refers more particularly to an improved form of hub for the wheels and the object of the invention is to provide an improved construction whereby a wheel can be removed and replaced, the complete operation being effected in a short interval of time and without the employment of a considerable number of tools as is now customarily required.

With the above object in view the invention consists essentially of an inner carrier portion mounted on the axle and provided with outstanding parts, a second outer portion, fitted with cross openings, rigidly attached to the wheel and fitting over the first named portion and provided with projecting parts formed to pass into the cross openings aforesaid and releasable means for locking the two portions together when brought together, the parts being arranged and constructed as hereinafter more particularly described and later pointed out in the appended claims.

Referring now to the drawings in which like characters of reference indicate corresponding parts in each figure; Figure 1 represents a side view, parts in vertical section, of my improvement in wheels. Fig. 2 represents a face view of the inner carrier and outer portions and associated parts, certain portions being shown in section. Fig. 3 represents a perspective view of the outer portion connected to the wheel. Fig. 4 represents a perspective view of the carrier portion.

1 represents the axle of a wheel on which I have mounted a carrier portion 2.

3 represents the second or outer portion mounted on the carrier portion and releasably attached to the same in a manner later described.

The carrier portion comprises the following elements;—4 is a central cylinder rotatably mounted on the axle and supplied with an outstanding flange 5 having portions thereof cut away to present openings 6, 7 and 8 for a purpose later apparent. 9 is a face plate of the same radius as the flange which plate is mounted on the cylinder immediately adjoining the flange, being spaced therefrom by intervening ribs 10 formed as part of the plate. Fastening screws 11 secure the plate to the flange, these screws passing through the ribs as best shown in Fig. 2 of the drawing. The facing plate has portions thereof cut away as indicated at 12, 13 and 14 thereby providing openings which when the plate and flange are connected register with the cut away portions of the flange and thereby provide continuous cross openings A, B and C in the periphery of the carrier portion. Ball bearings 15 are employed to effect the mounting of the carrier portion on the axle. These can be of any approved construction and can be arranged in any desirable manner. 16 is a locking ring mounted on the outer edges of the flange and facing plate and fitted in the present instance with three distinct inwardly projecting webs 17, 18 and 19, the webs being normally slidably received between the edges of the plate and flange and riding so to speak on the ribs which it will be noticed terminate in each instance somewhat back from the peripheries of the plate and flange. The locking ring has the outer edges thereof fitted with spanner notches 20 for the application of a tool.

With the above explanation it will be seen that the webs although normally contained between the flange and plate can be projected into the openings hereinbefore referred to by the turning of the ring in a proper direction.

In order that the webs may be locked in their withdrawn or projected positions I have supplied a number of locking devices located between the flange and the plate and between the ribs. Each locking device comprises a pivoted socket 21 carrying a permanent extending stem 22 at the outer end of which I have mounted slidably a detent 23 having a rounded end. A spring 24 is mounted on the spindle between the detent and the base of the socket. Each web is supplied with a notch 25 which receives the detent at all times. The ribs are arranged to engage with and limit the swinging movement of the detent.

In referring to Fig. 2 of the drawing it will be seen that the webs are in the withdrawn position and locked in this position by the detents. Upon one turning the locking ring the detents are initially forced in against the action of the springs until such time that the detents have assumed a radial position after which instant the springs operate to aid in the turning of the ring and finally effect the locking of the webs in the extended position, this occurring when the detents have swung over and engaged with the opposite ribs. The action is accordingly entirely automatic, the locking devices effecting the locking of the ring in its extreme turned positions.

The second portion 3 of the device is now described in detail: It comprises an outer cylindrical member 26 designed to receive the inner cylindrical member 4 and carrying two opposing nave plates 27 and 28 between which are located the spokes 29 of the wheel, the spokes being suitably fastened to the plates in any convenient way. The nave plate 28 in the present instance carries three concentrically arranged projecting members 30, 31 and 32 having their outer faces fitted with channels 33. The members 30, 31 and 32 are arranged such that when the outer cylinder 26 is placed on the inner cylinder 4 and the webs 17, 18 and 19 are in the withdrawn position they enter freely the openings A, B and C provided in the carrier portion 2. The channels 33 are designed when the parts are brought together to receive the webs in the projected positions thereof.

The construction herein described provides a very easy method of removing the wheel from the vehicle for repair or other purposes as it is only a matter of turning the ring to withdraw the webs from the channels 33. The wheel can be pulled off by withdrawing it in a direction toward the outer end of the axle.

Various other well known mechanical arrangements might be readily suggested to effect in a releasable way the fastening and locking of the two principal parts of the device but I wish it to be distinctly understood that any such modified constructions are simply modifications and come under the scope of this specification and the appended claims.

What I claim as my invention is:

1. The combination with a vehicle axle, of an inner cylindrical carrier portion rotatably mounted on the axle and formed with outstanding parts presenting cross openings, a ring rotatably mounted on the outstanding parts and crossing the openings, locking webs carried by the ring and an outer wheel carrying cylindrical portion mounted on the inner portion and provided with channeled projecting parts arranged to pass into the cross openings, the said channels being designed to receive the webs upon the ring being turned, as and for the purpose specified.

2. The combination with a vehicle axle, of a central cylinder rotatably mounted on the axle and having an out-standing flange with portions thereof cut away at the periphery, a face plate secured to the flange and fitted with openings registering with the flange openings, a locking ring rotatably mounted on the peripheries of the flange and facing plate and fitted with inwardly projecting webs slidably received between the flange and plate, an outer cylindrical wheel carrying portion slidably mounted on the carrier portion and provided with spaced extending channeled members on the side next the flange, the said members being designed to enter the openings in the flange and plate and having the channels arranged to receive the webs when projected by the turning of the ring and means effecting the locking of the ring in the projected and withdrawn positions of the webs, as and for the purpose specified.

Signed at United States consulate general in the county of London, England, this 13th day of June 1914.

JETHRO THOMAS WADE.

In the presence of two witnesses:
RIPLEY WILSON,
O. J. WORTH.